(12) United States Patent
Lilley

(10) Patent No.: US 11,738,977 B2
(45) Date of Patent: Aug. 29, 2023

(54) SYSTEM AND METHOD FOR TRANSFER OF LOADS FROM MOBILE ROBOTS

(71) Applicant: Southworth Products Corporation, Falmouth, ME (US)

(72) Inventor: Mark W. Lilley, Scarborough, ME (US)

(73) Assignee: Southworth Products Corporation, Falmouth, ME (US)

( * ) Notice: Subject to any disclaimer, the term of this patent is extended or adjusted under 35 U.S.C. 154(b) by 33 days.

(21) Appl. No.: 17/444,383

(22) Filed: Aug. 3, 2021

(65) Prior Publication Data

US 2022/0041415 A1   Feb. 10, 2022

Related U.S. Application Data

(60) Provisional application No. 63/060,961, filed on Aug. 4, 2020.

(51) Int. Cl.
*B66F 9/06* (2006.01)
*B65G 67/02* (2006.01)
*G05D 1/02* (2020.01)
*B65G 13/02* (2006.01)

(52) U.S. Cl.
CPC .............. *B66F 9/063* (2013.01); *B65G 13/02* (2013.01); *B65G 67/02* (2013.01); *G05D 1/0225* (2013.01); *B65G 2203/0216* (2013.01); *G05D 2201/0216* (2013.01)

(58) Field of Classification Search
CPC ...... B65G 67/02; B65G 13/02; B65G 1/0435; G05D 1/0225; G05D 2201/0216; B66F 9/063

See application file for complete search history.

(56) References Cited

U.S. PATENT DOCUMENTS

| 10,894,664 B1 * | 1/2021 | Brady | B65G 1/1378 |
| 2019/0064845 A1 * | 2/2019 | Pardasani | G05D 1/0225 |
| 2019/0291956 A1 * | 9/2019 | Pajevic | B66F 9/063 |
| 2020/0239230 A1 * | 7/2020 | Kozlenok | B65G 1/10 |

FOREIGN PATENT DOCUMENTS

| CN | 112850043 A | * | 5/2021 |
| CN | 115129061 A | * | 9/2022 |

* cited by examiner

*Primary Examiner* — Kaitlin S Joerger
(74) *Attorney, Agent, or Firm* — Grossman, Tucker, Perreault & Pfleger, PLLC

(57) ABSTRACT

A system for transferring loads from a mobile robot device. The system includes a transportable conveyor platform. The mobile robot device transports the transportable conveyor platform to/from a lift mechanism. The lift mechanism lifts the transportable conveyor platform and any load thereon from the mobile robot device and to a desired height for unloading the load.

19 Claims, 3 Drawing Sheets

SYSTEM AND METHOD FOR TRANSFER OF LOADS FROM MOBILE ROBOTS

CROSS-REFERENCE TO RELATED APPLICATIONS

The present application claims the benefit of the filing date of U.S. provisional application Ser. No. 63/060,961, filed Aug. 4, 2020, the entire teachings of which are hereby incorporated herein by reference.

TECHNICAL FIELD

The present application relates to generally to systems and methods for transfer of loads from mobile robots.

BACKGROUND

Mobile robots are used in a wide variety of industrial and home applications. In some applications, mobile robots are configured as material handling robots for autonomously traveling in a self-propelled manner to transport loads in a warehouse setting. For example, the robots may be configured for retrieving a load from one location in a warehouse and transporting it to a vehicle or vice-versa.

One challenge associated with material handling robots involves lifting a load to, or retrieving a load from, a height above the height of the robot. Known solutions have incorporated a mechanical lift on the robot for raising and/or lowering load. Unfortunately, mobile robots typically have limited electrical power stored in one or more batteries that also provide electrical power for autonomously transporting the load. A lift mechanism can use a significant amount of the battery power, especially when lifting/lowering a heavy load, such as a pallet of materials. This can require frequent recharging of the robot and may result in failure of the lift mechanism when the robot battery power is fully depleted.

BRIEF DESCRIPTION OF THE DRAWINGS

The features of this disclosure, and the manner of attaining them, will become more apparent and better understood by reference to the following description of embodiments described herein taken in conjunction with the accompanying drawings, wherein.

DETAILED DESCRIPTION

Figure 1:
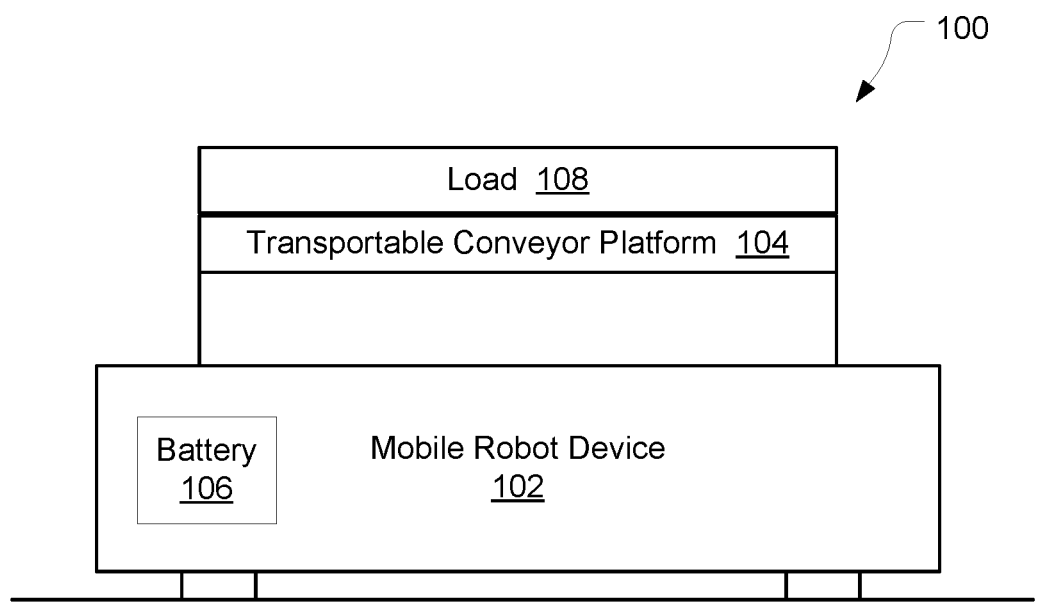
FIG. 1 is an end diagrammatic view of one example of a system consistent with the present disclosure.

The present disclosure is not limited in its application to the details of construction and the arrangement of components set forth in the following description or illustrated in the drawings. The examples described herein may be capable of other embodiments and of being practiced or being carried out in various ways. Also, it may be appreciated that the phraseology and terminology used herein is for the purpose of description and should not be regarded as limiting as such may be understood by one of skill in the art. Throughout the present description, like reference characters may indicate like structure throughout the several views, and such structure need not be separately discussed. Furthermore, any particular feature(s) of a particular exemplary embodiment may be equally applied to any other exemplary embodiment(s) of this specification as suitable. In other words, features between the various exemplary embodiments described herein are interchangeable, and not exclusive.

In general, systems and methods for transporting loads to, and from, mobile robots consistent with the present disclosure includes providing a transportable conveyor platform on the robot. A load may be placed on the transportable conveyor platform and transported by the mobile robot to a lift mechanism having its own source of electrical power. In some embodiments, the lift mechanism may lift the transportable conveyor platform from the mobile robot and raise the transportable conveyor platform to a desired height. In some embodiments, the transportable conveyor platform may include one or more powered rollers that receives electrical power from the lift mechanism. When the transportable conveyor platform and the load thereon are lifted to the desired height by the lift mechanism, the powered roller(s) of the transportable conveyor platform may be energized to roll the load to a desired location, such as an interface conveyor for further transporting of the load, to a shelf, a truck, etc. In some embodiments, the rollers on the transportable conveyor platform may mechanically interface with a drive system on the lift mechanism configured to drive one or more rollers of the transportable conveyor platform to roll the load to the desired location.

A system and method consistent with the present disclosure may be implemented in a variety of configurations. FIG. 1, for example, is an end diagrammatic view of one example embodiment of a system 100 consistent with the present disclosure. The illustrated system 100 includes a mobile robot device 102 and a transportable conveyor platform 104. The mobile robot device 102 includes a robot battery 106 for providing electrical power to a known drive system, sensors, user input/output devices, wireless communication components, navigation components, a camera, etc. that may be provided on the mobile robot device 102. The mobile robot device is configured for receiving the transportable conveyor platform 104, e.g., with or without a load 108 thereon, and to transport the transportable conveyor platform 104 along a surface in a known manner using electrical power provided by the robot battery 106.

In the illustrated example, the transportable conveyor platform 104 is disposed on top of the mobile robot device 102 and a load 108 is disposed on top of the transportable conveyor platform 104. For simplicity and ease of explanation, embodiments may be described herein in connection with transporting a load 108 to a lift mechanism for lifting the load 108 to a desired height. It is to be understood, however, that in systems consistent the present invention a mobile robot device 102 may transport a transportable conveyor platform 104 without a load 108 thereon to a lift mechanism for receiving a load 108 from a lift mechanism and then transporting the load 108 to a different location.

The transportable conveyor platform 104 may take a variety of configurations and may include a frame with one or more rollers. The term "roller" as used herein includes any known structure used for rolling a load on a conveyor platform including, for example, known cylindrical roller configurations and known belt configurations. For example, the transportable conveyor platform may include a plurality of cylindrical rollers supported by the frame for rotation about separate associated axes, a single elongate belt that rotates about a central axis, or combinations thereof. The frame and rollers may be configured to carry the load 108 and roll the load 108 onto, or off, the transportable conveyor platform 104 to/from a desired location. The frame is sized to receive a load 108 on a top surface thereof so that the bottom surface thereof can rest on the top of the mobile robot device 102. The mobile robot device 102 transports the transportable conveyor platform 104 and the load 108 to a desired location.

Figure 2:
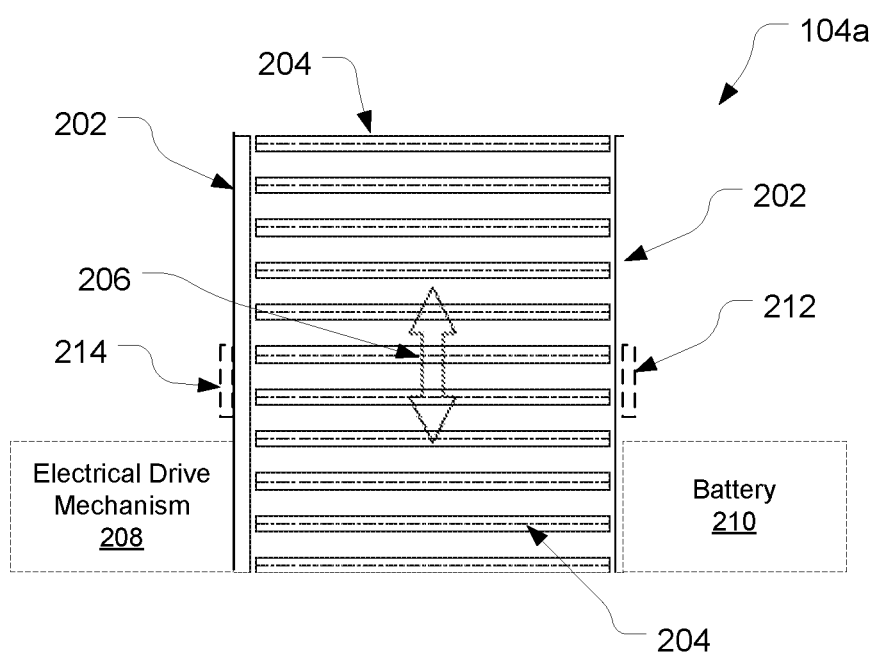
FIG. 2 is a top diagrammatic view of on example of a transportable conveyor platform consistent with the present disclosure.

FIG. 2 is a top view of one example of a transportable conveyor platform 104a consistent with the present disclosure. In the illustrated example, the transportable conveyor platform 104a includes a frame 202 with a plurality of rollers 204 rotatably supported on the frame 202 for rolling a load 108 in direction across the rollers as shown generally by the arrow 206. In some embodiments, one or more of the rollers 204 may be powered by an electrical drive mechanism 208. The drive mechanism 208 of the transportable conveyor platform 104a may be energized to roll the load 108 onto, or off, the transportable conveyor platform 104a.

Figure 3:
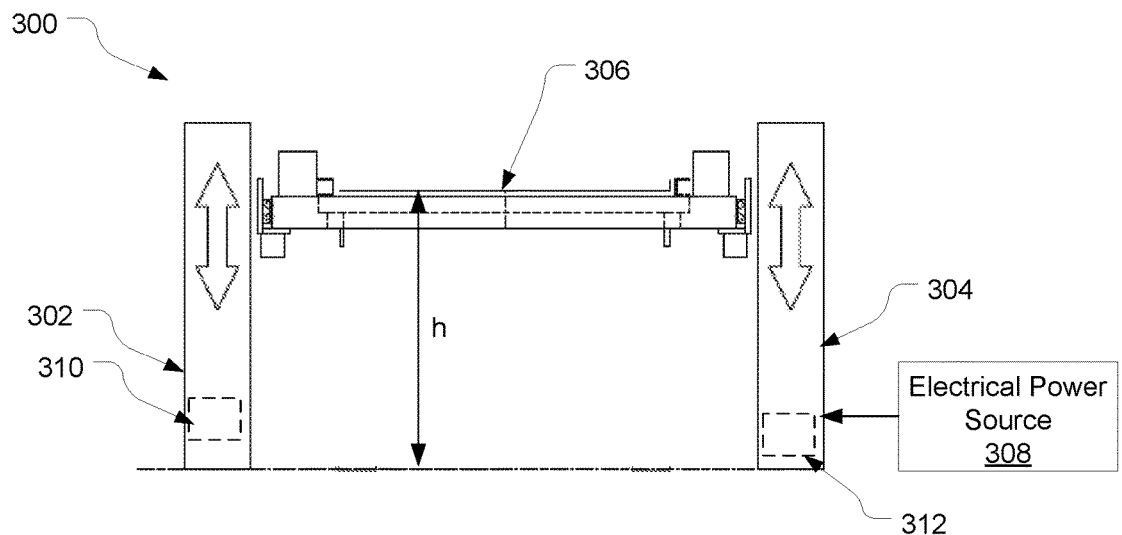
FIG. 3 is an end diagrammatic view of a lift mechanism consistent with the present disclosure.

In general, the mobile robot device 102 in a system consistent with the present disclosure may receive the transportable conveyor platform 104, 104a with, or without, a load 108 thereon, and transport the transportable conveyor platform 104, 104a to a lift mechanism configured for lifting the transportable conveyor platform 104, 104a from the mobile device 102 using an electrical power source separate from the robot battery 106. In FIG. 3 is a diagrammatic end view of one example of a lift mechanism 300 consistent with the present disclosure. In the illustrated example embodiment, the lift mechanism 300 includes first 302 and second 304 lift columns coupled to opposite sides of a lift platform 306. The lift columns 302, 304 may include a known mechanism for lifting the lift platform 306 to a desired height h along the lift columns 302, 304. In some embodiments for example, the lift columns 302, 304 may include known worm drive or scissor lifts for lifting and lowering the lift platform 306 in synchronized manner.

Electrical power for driving the lifts of the lift columns 302, 304 is provided by a lift mechanism power source 308, e.g., a battery source or a line source of 120 or 220 VAC. The lift mechanism power source 308 is separate from the robot battery 106. The lift mechanism power source 308 may also provide power for sensors on the lift columns 302, 304, user input/output interfaces, an electrical drive mechanism 208 on the transportable conveyor platform 104 etc. In some embodiments, for example, the lift mechanism 300 may include height sensors 310 thereon that provide drive control signals to the lift mechanism 300 for controllably lifting the lift platform 306 and any transportable conveyor platform 104, 104a thereon to the desired height h for interfacing with any separate device, e.g., conveyor, a shelf, a truck etc., or a person.

The drive mechanism 208 for the rollers 204 of the transportable conveyor platform 104a may be powered by a conveyor platform battery 210 of the transportable conveyor platform 104, 104a. The transportable conveyor platform 104, 104a may include at least one electrical charging contact 212 configured to connect the conveyor platform battery 210 with a separate power source, e.g., the lift mechanism power source 308 of the lift mechanism 300, when the transportable conveyor platform 104, 104a is disposed on the lift mechanism 300 for charging the conveyor platform battery 210. In addition, or alternatively, the transportable conveyor platform 104, 104a may include one or more electrical contacts 214 thereon for electrically connecting the drive mechanism 208 to the lift mechanism power source 308 of the lift mechanism 300 when the transportable conveyor platform 104, 104a is disposed on the lift mechanism 300. The lift mechanism power source 308 of the lift mechanism 300 may provide power for driving the electrical drive mechanism 208 to rotate one or more of the rollers 204 and move the load 108 to/from the transportable conveyor platform 104, 104a.

Figure 4:
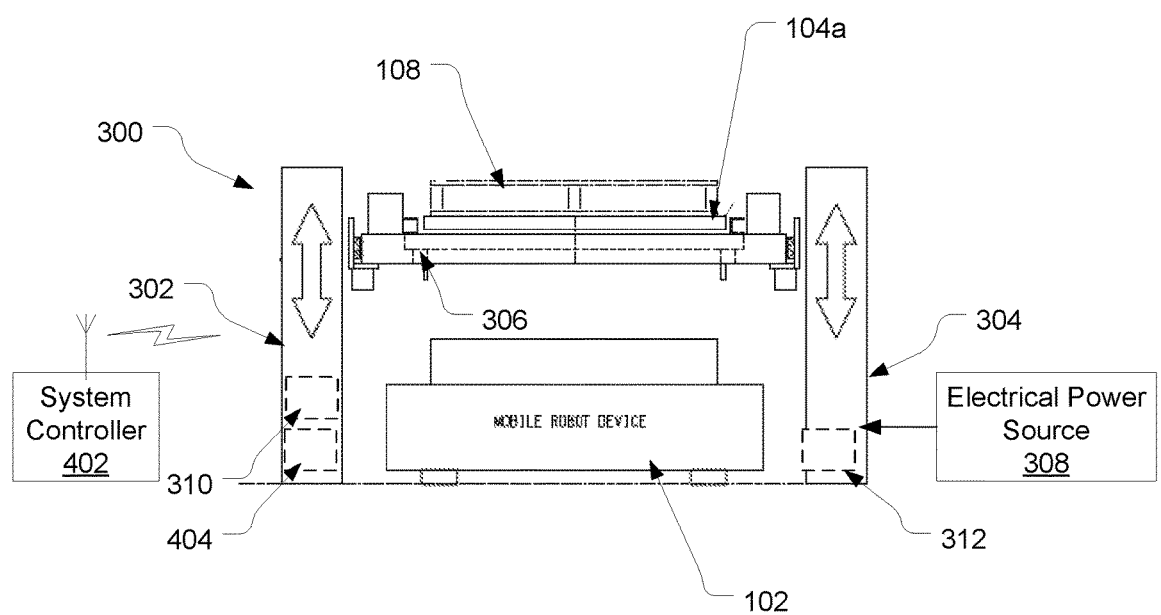
FIG. 4 is an end diagrammatic view of a system consistent with the present disclosure.

FIG. 4 is an end diagrammatic view of a system consistent the present disclosure illustrating one example a transportable conveyor platform 104a with a load 108 thereon and a lift mechanism 300 consistent with the present disclosure. In general, a mobile robot device 102 may include known transmitters and/or sensors (not shown), e.g., optical, video, magnetic, etc. thereon for positioning the mobile robot device 102 between the lift columns 302, 304 of the lift mechanism 300. The lift mechanism 300 may include one or alignment devices 312, e.g., one or mor more transmitters and/or sensors thereon for cooperating with the sensors on the mobile robot device 102 and/or wirelessly communicating with the mobile robot device 102 to position the robot device 102 between the lift columns 302, 304. For example, the lift mechanism 300 may transmit one or more optical, e.g., infrared, beacons that the mobile robot device 102 follows to align itself between the lift columns 302, 304.

Once the mobile robot device 102 is aligned between the lift columns 302, 304 the lift mechanism 300 may lift the lift platform 306 to lift the transportable conveyor platform 104a any load 108 thereon from the mobile robot device 102. The lift mechanism 300 may lift the transportable conveyor platform 104a and any load 108 thereon to a desired height h (FIG. 3). The load 108 may then be transferred from the transportable conveyor platform 104a to another location or the transportable conveyor platform 104a with the load 108 thereon may be transferred to another location.

Figure 5:
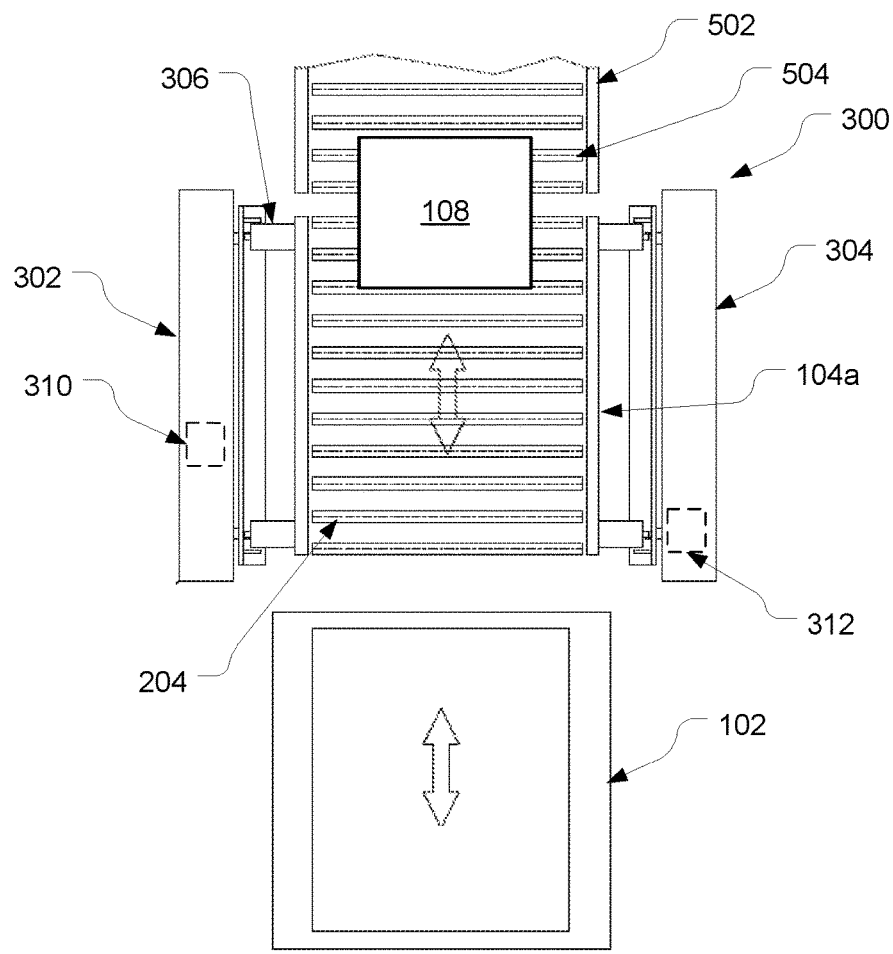
FIG. 5 is a top diagrammatic view of a system consistent with the present disclosure.

For example, FIG. 5 is a top diagrammatic view of a system consistent with the present disclosure illustrating transport of a load 108 from a transportable conveyor platform 104a to a separate conveyor interface 502. The height sensors 310 of the lift mechanism 300 may provide drive control signals to the lift mechanism 300 for controllably lifting the transportable conveyor platform 104a to a fixed height of the separate interface conveyor 502. One or more rollers 204 of the transportable conveyor platform 104a may then be energized to roll any load 108 on the transportable conveyor platform 104a onto the interface conveyor 502. The interface conveyor 502 may then transport and the load 108 to another location, e.g., using driven rollers 504. The lift mechanism 300 may then lower the transportable conveyor platform 104a back onto the same or a different mobile robot device 102 and the mobile robot device 102 may transport the transportable conveyor platform 104a to a location for receiving another load 108.

With reference again to FIG. 4, in some embodiments, a system controller 402 may interface wirelessly or through a wired connection with the lift mechanism 300 and the mobile robot device 102. The system controller 502 may include a user interface, e.g., on a desktop or mobile computing device, for controlling operation of the system. For example, the system controller 402 may control operation of the lift mechanism 300 and/or the mobile robot device 102 to synchronize positioning of the lift platform 306 to receive a transportable conveyor platform 104, 104a from a mobile robot device 102, to report status of loads 108 to a user, to scan a feature of the load, e.g., bar code information, from each pallet or load 108 received at a lift mechanism 300 using a known scanner 404 coupled to the lift mechanism 300, etc. Scanning features of the load may be used to record and/or track the status of the load, e.g., for tracking inventory, shipping status, etc. The mobile robot device 102 and the lift mechanism 300 may thus be controlled by the system controller 502 to cooperatively move loads 108 to/from a desired height.

Figure 6:
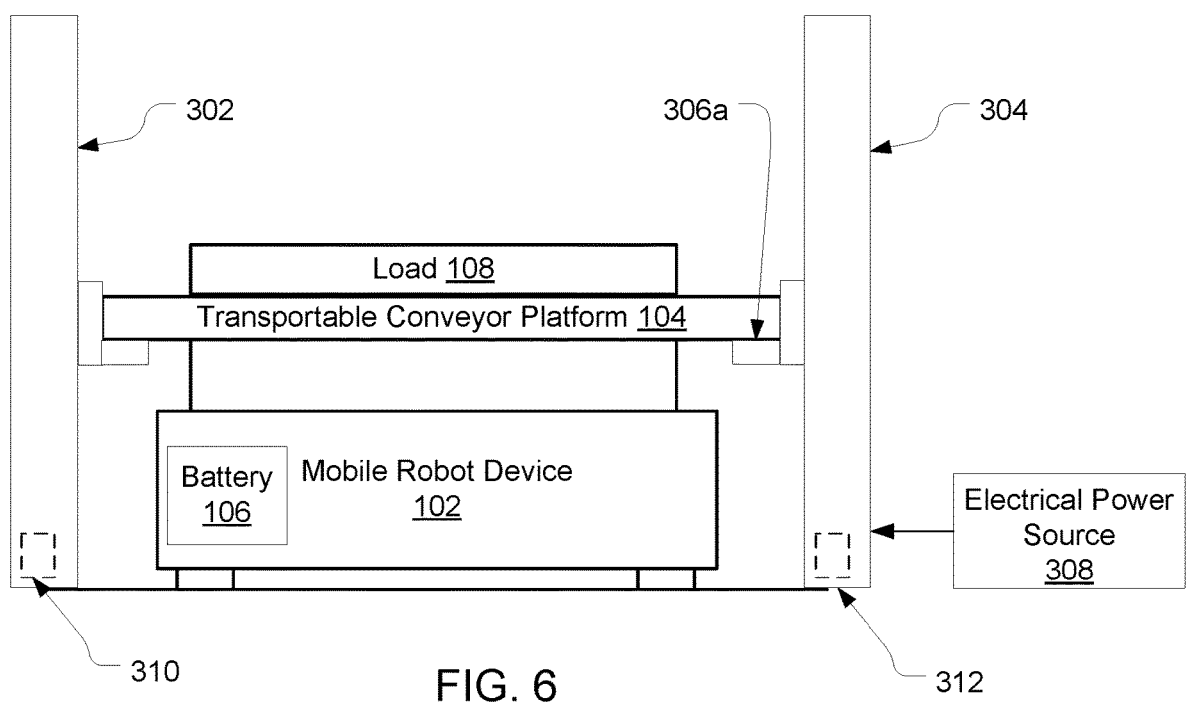
FIG. 6 is an end diagrammatic view of another system consistent with the present disclosure.

The lift mechanism 300 may lift the transportable conveyor platform 104, 104a from the mobile robot device 102 in a variety of ways. FIG. 6, for example, illustrates one configuration for facilitating lifting of a transportable conveyor platform 104 and the load 108 thereon from the mobile robot device 102. In the illustrated example, embodiment, the transportable conveyor platform 104 is sized to extend outwardly from the perimeter of the mobile robot device 102. When the mobile robot device 102 positions the transportable conveyor platform 104 between the lift columns, shelves on a lift platform 306a are positioned beneath outer edges of the transportable conveyor platform 104. As the lift columns 302, 304 lift the lift platform 306a upward, the shelves engage the bottom of the transportable conveyor platform 104 to lift the transportable conveyor 104 and any load 108 thereon off the mobile robot device 102.

Advantageously, in some embodiments of a system and method consistent with the present disclosure the mobile robot device 102 may be operated to transport the transportable conveyor platform 104, with or without a load 108 thereon, to/from a lift mechanism 300 and the robot battery 106 of the mobile robot device 102 is not used to lift the load 108. Depletion of the robot battery 106 of the mobile robot associated with the lifting is avoided. Lifting of the load 108 and the transportable conveyor platform 104 may be performed by the lift mechanism 300, which is powered by its own electrical power source 309, and the load 108 may be rolled off the lift mechanism 300 by the transportable conveyor platform 104. Any powered rollers on the transportable conveyor platform 104 may be powered by a separate battery 210 and/or the electrical power source 308 of the lift mechanism 300.

According to an aspect of the disclosure, there is thus provided a system including: a transportable conveyor platform configured to receive a load thereon, the transportable conveyor platform comprising a frame and at least one roller supported by the frame; a mobile robot device comprising a robot battery, the mobile robot device being configured to receive the transportable conveyor platform and transport the transportable conveyor platform along a surface using electrical power provided by the robot battery; and a lift mechanism configured to lift the transportable conveyor platform from the mobile robot device using a lift mechanism power source coupled to the lift mechanism and separate from the robot battery.

According to another aspect of the disclosure, there is provided a system including: a transportable conveyor platform configured to receive a load thereon, the transportable conveyor platform comprising a frame, at least one roller supported by the frame, and a drive mechanism configured to drive the at least one roller to rotate about an axis; a mobile robot device comprising a robot battery, the mobile robot device being configured to receive the transportable conveyor platform and transport the transportable conveyor platform along a surface using electrical power provided by the robot battery; and a lift mechanism comprising first and second lift columns and a lift platform, the lift platform being configured to engage the transportable conveyor platform for lifting the transportable conveyor platform from the mobile robot using a lift mechanism power source separate from the robot battery.

According to another aspect of the disclosure, there is provided a method including placing a transportable conveyor platform on a mobile robot device, the transportable conveyor platform comprising a frame supporting at least one roller; operating the mobile robot device to transport the transportable conveyor platform to a lift mechanism using power provided from a robot battery of the mobile robot device; lifting the transportable conveyor platform from the mobile device to a desired height using the lift mechanism, the lift mechanism lifting the transportable conveyor platform using power from a lift mechanism power source separate from the robot battery; and rolling a load to or from the transportable conveyor platform.

According to another aspect of the present disclosure, there is thus provided a system including a mobile robot device comprising a battery; a transportable conveyor platform configured to be disposed on a top of the mobile robot device; and a lift mechanism configured to lift the transportable conveyor platform from the mobile robot device using an electrical power source separate from the battery.

According to another aspect of the disclosure, there is provided a method including: placing a transportable conveyor platform on top of a mobile device; operating the mobile device to transport the transportable conveyor platform to a lift mechanism using power provided from a battery of the mobile device; lifting the transportable conveyor platform from the mobile device to a desired height using the lift mechanism receiving power from an electrical power source separate from the battery; and rolling a load from the transportable conveyor platform.

According to another aspect of the disclosure, there is provided a transportable conveyor platform for a system for transferring loads from a mobile robot device, the transportable conveyor platform including: a frame; at least one roller coupled to the frame; a drive mechanism configured to drive the roller to rotate about an axis; and at least one electrical contact configured to connect with an electrical power source of separate lift mechanism, whereby power for driving the drive mechanism is provided by the electrical power source when the transportable conveyor platform is disposed on the lift mechanism.

According to another aspect of the disclosure, there is provided a transportable conveyor platform for a system for transferring loads from a mobile robot device, the transportable conveyor platform including: a frame; at least one roller coupled to the frame; a drive mechanism configured to drive the roller to rotate about an axis; at least one battery for providing electrical power for driving the drive mechanism; and at least one electrical charging contact configured to connect with an electrical power source of separate lift mechanism for charging the battery when the transportable conveyor platform is disposed on the lift mechanism.

According to another aspect of the disclosure, there is provided a lift mechanism for transferring loads from a mobile robot device, the mechanism including: a lift platform; first and second lift columns positioned on opposite sides of the lift platform and configured for lifting the lift platform to a desired height; and at least one alignment device, such as a transmitter or sensor, configured for aligning the mobile robot device between the lift columns for unloading a transportable conveyor platform onto the lift platform.

The foregoing description of example embodiments has been presented for the purposes of illustration and description. It is not intended to be exhaustive or to limit the present disclosure to the precise forms disclosed. Many modifications and variations are possible in light of this disclosure. It is intended that the scope of the present disclosure be limited not by this detailed description, but rather by the claims appended hereto.

Embodiments of the methods described herein may be implemented using a controller, processor and/or other programmable device. To that end, the methods described herein may be implemented on a tangible, non-transitory computer readable medium having instructions stored thereon that when executed by one or more processors perform the methods. Thus, for example, the memory may store instructions (in, for example, firmware or software) to perform the operations described herein. The storage medium may include any type of tangible medium, for example, any type of disk optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories, magnetic or optical cards, or any type of media suitable for storing electronic instructions.

It will be appreciated by those skilled in the art that any block diagrams herein represent conceptual views of illustrative circuitry embodying the principles of the disclosure. Similarly, it will be appreciated that any block diagrams, flow charts, flow diagrams, state transition diagrams, pseudocode, and the like represent various processes which may be substantially represented in computer readable medium and so executed by a computer or processor, whether or not such computer or processor is explicitly shown. Software modules, or simply modules which are implied to be software, may be represented herein as any combination of flowchart elements or other elements indicating performance of process steps and/or textual description. Such modules may be executed by hardware that is expressly or implicitly shown.

The functions of the various elements shown in the figures, including any functional blocks labeled as a controller or processor, may be provided through the use of dedicated hardware as well as hardware capable of executing software in association with appropriate software. The functions may be provided by a single dedicated processor, by a single shared processor, or by a plurality of individual processors, some of which may be shared. Moreover, explicit use of the term controller or processor should not be construed to refer exclusively to hardware capable of executing software, and may implicitly include, without limitation, digital signal processor (DSP) hardware, network processor, application specific integrated circuit (ASIC), field programmable gate array (FPGA), read-only memory (ROM) for storing software, random access memory (RAM), and non-volatile storage. Other hardware, conventional and/or custom, may also be included.

The term "coupled" as used herein refers to any connection, coupling, link, or the like by which signals carried by one system element are imparted to the "coupled" element. Such "coupled" devices, or signals and devices, are not necessarily directly connected to one another and may be separated by intermediate components or devices that may manipulate or modify such signals.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems. Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Although the methods and systems have been described relative to a specific embodiment thereof, they are not so limited. Obviously, many modifications and variations may become apparent in light of the above teachings. Many additional changes in the details, materials, and arrangement of parts, herein described and illustrated, may be made by those skilled in the art.

What is claimed is:

1. A system comprising:
   a transportable conveyor platform configured to receive a load thereon, the transportable conveyor platform comprising a frame and at least one roller supported by the frame;
   a mobile robot device comprising a robot battery, the mobile robot device being configured to receive the transportable conveyor platform and transport the transportable conveyor platform along a surface using electrical power provided by the robot battery; and
   a lift mechanism configured to lift the transportable conveyor platform from the mobile robot device using a lift mechanism power source coupled to the lift mechanism and separate from the robot battery,
   wherein the transportable conveyor platform comprises a drive mechanism configured to drive the at least one roller to rotate about an axis using electrical power from a power source that is separate from the robot battery, and
   wherein the power source is the lift mechanism power source, and wherein the transportable conveyor platform includes at least one electrical contact positioned to electrically couple the drive mechanism to the lift mechanism power source when the transportable conveyor platform is disposed on the lift mechanism.

2. A system according to claim 1, wherein the lift mechanism comprises first and second lift columns and a lift platform, the lift platform being configured to engage the transportable conveyor platform for lifting the transportable conveyor platform from the mobile robot device.

3. A system according to claim 2, wherein the lift mechanism comprises an alignment device configured to cooperate with the mobile robot device to position the mobile robot device between the first and second lift columns.

4. A system according to claim 1, wherein the lift mechanism comprises a scanner for scanning feature of the load.

5. A system according to claim 1, the system further comprising a system controller configured to communicate with the mobile robot device and the lift mechanism for controlling operation of the system.

6. A system comprising:
   a transportable conveyor platform configured to receive a load thereon, the transportable conveyor platform comprising a frame, at least one roller supported by the frame, and a drive mechanism configured to drive the at least one roller to rotate about an axis;

a mobile robot device comprising a robot battery, the mobile robot device being configured to receive the transportable conveyor platform and transport the transportable conveyor platform along a surface using electrical power provided by the robot battery; and a lift mechanism comprising first and second lift columns and a lift platform, the lift platform being configured to engage the transportable conveyor platform for lifting the transportable conveyor platform from the mobile robot using a lift mechanism power source separate from the robot battery, wherein the drive mechanism is configured to drive the at least one roller using electrical power from a power source that is separate from the robot battery, and wherein the power source is the lift mechanism power source, and wherein the transportable conveyor platform includes at least one electrical contact positioned to electrically couple the drive mechanism to the lift mechanism power source when the transportable conveyor platform is disposed on the lift mechanism.

7. A system according to claim 6, wherein the lift mechanism comprises an alignment device configured to cooperate with the mobile robot device to position the mobile robot device between the first and second lift columns.

8. A system according to claim 6, wherein the lift mechanism comprises a scanner for scanning feature of the load.

9. A system according to claim 6, the system further comprising a system controller configured to communicate with the mobile robot device and the lift mechanism for controlling operation of the system.

10. A method comprising:
placing a transportable conveyor platform on a mobile robot device, the transportable conveyor platform comprising a frame supporting at least one roller;
operating the mobile robot device to transport the transportable conveyor platform to a lift mechanism using power provided from a robot battery of the mobile robot device;
lifting the transportable conveyor platform from the mobile device to a desired height using the lift mechanism, the lift mechanism lifting the transportable conveyor platform using power from a lift mechanism power source separate from the robot battery; and
rolling a load to or from the transportable conveyor platform
wherein the at least one roller comprises a powered roller for rolling the load off the transportable conveyor platform, and
wherein the powered roller is driven using electrical power from a power source separate from the robot battery.

11. A system comprising:
a transportable conveyor platform configured to receive a load thereon, the transportable conveyor platform comprising a frame and at least one roller supported by the frame;
a mobile robot device comprising a robot battery, the mobile robot device being configured to receive the transportable conveyor platform and transport the transportable conveyor platform along a surface using electrical power provided by the robot battery; and
a lift mechanism configured to lift the transportable conveyor platform from the mobile robot device using a lift mechanism power source coupled to the lift mechanism and separate from the robot battery,
wherein the transportable conveyor platform comprises a drive mechanism configured to drive the at least one roller to rotate about an axis using electrical power from a power source that is separate from the robot battery, wherein the power source is a conveyor platform battery coupled to the transportable conveyor platform, and wherein the transportable conveyor platform includes at least one electrical contact positioned to electrically couple the lift mechanism power source to the conveyor platform battery when the transportable conveyor platform is disposed on the lift mechanism for charging the conveyor platform battery.

12. A system according to claim 11, wherein the lift mechanism comprises first and second lift columns and a lift platform, the lift platform being configured to engage the transportable conveyor platform for lifting the transportable conveyor platform from the mobile robot device.

13. A system according to claim 12, wherein the lift mechanism comprises an alignment device configured to cooperate with the mobile robot device to position the mobile robot device between the first and second lift columns.

14. A system according to claim 11, wherein the lift mechanism comprises a scanner for scanning feature of the load.

15. A system according to claim 11, the system further comprising a system controller configured to communicate with the mobile robot device and the lift mechanism for controlling operation of the system.

16. A system comprising:
a transportable conveyor platform configured to receive a load thereon, the transportable conveyor platform comprising a frame, at least one roller supported by the frame, and a drive mechanism configured to drive the at least one roller to rotate about an axis;
a mobile robot device comprising a robot battery, the mobile robot device being configured to receive the transportable conveyor platform and transport the transportable conveyor platform along a surface using electrical power provided by the robot battery; and
a lift mechanism comprising first and second lift columns and a lift platform, the lift platform being configured to engage the transportable conveyor platform for lifting the transportable conveyor platform from the mobile robot using a lift mechanism power source separate from the robot battery,
wherein the drive mechanism is configured to drive the at least one roller using electrical power from a power source that is separate from the robot battery,
wherein the power source is a conveyor platform battery coupled to the transportable conveyor platform, and
wherein the transportable conveyor platform includes at least one electrical contact positioned to electrically couple the lift mechanism power source to the conveyor platform battery when the transportable conveyor platform is disposed on the lift mechanism for charging the conveyor platform battery.

17. A system according to claim 16, wherein the lift mechanism comprises an alignment device configured to cooperate with the mobile robot device to position the mobile robot device between the first and second lift columns.

18. A system according to claim 16, wherein the lift mechanism comprises a scanner for scanning feature of the load.

19. A system according to claim 16, the system further comprising a system controller configured to communicate with the mobile robot device and the lift mechanism for controlling operation of the system.

* * * * *